United States Patent Office 2,815,100
Patented Dec. 3, 1957

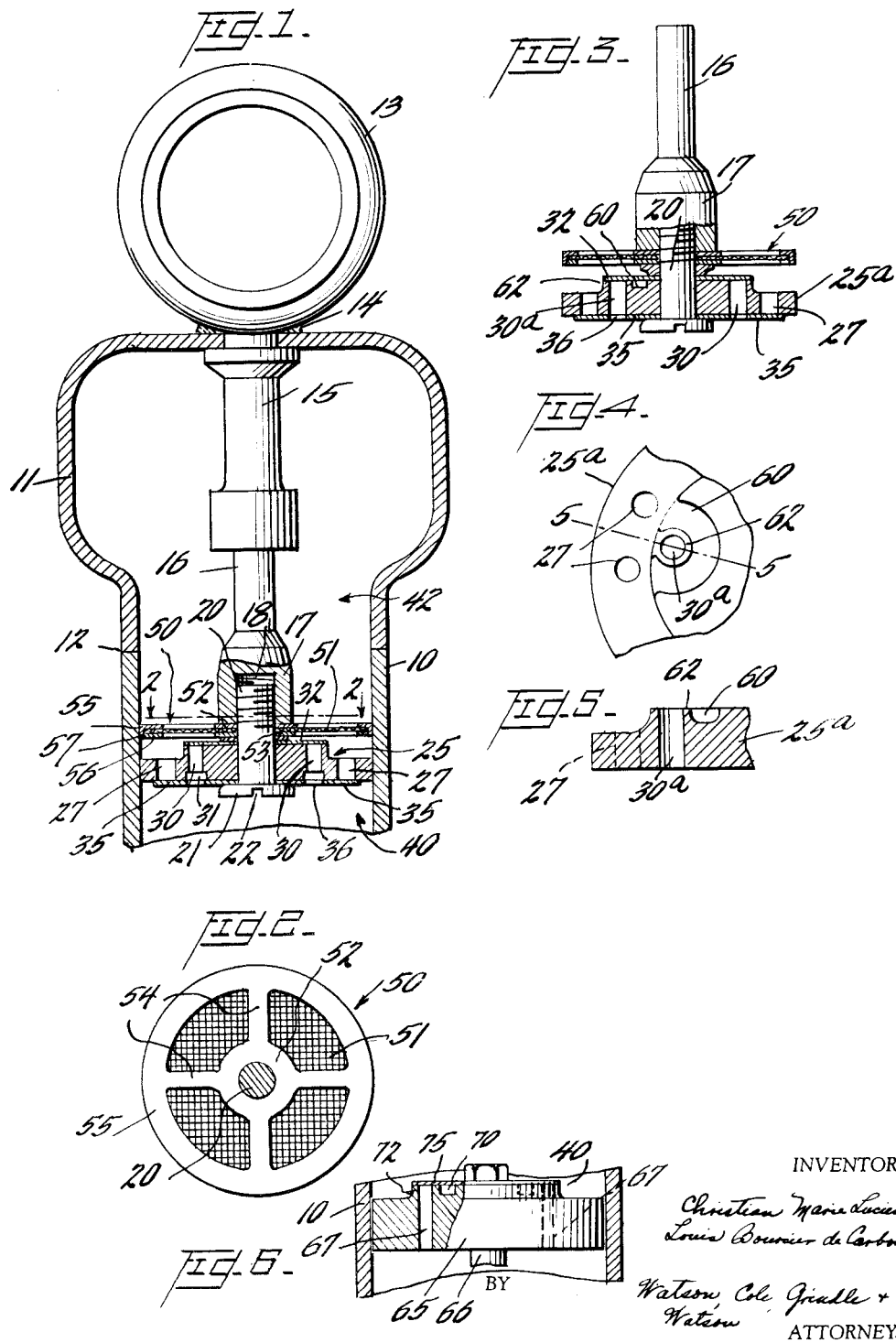

2,815,100

NON-STICKING SHOCK ABSORBER VALVE

Christian Marie Lucien Louis Bourcier de Carbon,
Neuilly-sur-Seine, France

Application December 16, 1953, Serial No. 398,593

7 Claims. (Cl. 188—100)

This invention relates to shock absorbers and more particularly to valving and deflecting arrangements which control and regulate the flow of pressure fluid, both in the working chamber and the cavitation or expansion reservoir of the shock absorber.

The present invention relates to subject matter which is similar to that of my copending applications, Serial No. 145,788, filed February 23, 1950, Serial No. 230,944, filed June 11, 1951, now Patent No. 2,748,898, granted June 5, 1956, and Serial No. 252,488, filed October 22, 1951, now Patent No. 2,757,762, granted August 7, 1956.

The general object of the invention is to provide novel and improved valve and valve seat arrangements on a shock absorber piston and on the partition between the working chamber and the expansion chamber or reservoir, and improved baffle structures to minimize turbulence of fluid passing from the valved orifices.

More specific objects and purposes will be apparent from the following specification when read in connection with the accompanying drawings in which certain embodiments of my invention are illustrated by way of example.

In the drawings:

Figure 1 is a fragmentary view in vertical section, showing the upper portion of a shock absorber cylinder with one embodiment of the cavitation chamber valving and baffling clearly shown;

Figure 2 is a plan view of a baffle screen taken on line 2—2 of Figure 1;

Figure 3 is a detail view mostly in section of a modified valving embodiment;

Figure 4 is a fragmentary plan view of the orificed partition between the working and cavitation chambers, depicting a non-sticking, clean-breaking valve orifice configuration;

Figure 5 is a fragmentary sectional view taken on line 5—5 of Figure 4; and

Figure 6 is a sectional view of an internal portion of the shock absorber showing the same valve feature embodied in a shock absorber piston.

Although the principles of the present invention may be applied to a wide variety of reciprocating direct acting shock absorbers, it is shown in Figure 1 as supported from the upper end of the cylinder or casing of the shock absorber similar to the one shown in my earlier filed applications. The principal portion of the cylinder wall which mainly surrounds the working chamber of the shock absorber is indicated by the numeral 10 and it will be seen that a domed head member 11 is welded or otherwise secured to the cylindrical wall as at 12. An eye member 13 for connecting the shock absorber cylinder to the vehicle part or other member to be damped, is welded as at 14 to the top of the dome 11 and a supporting post 15 preferably extends from the ring 13 through an opening in the dome and downwardly within the shock absorber.

Suitably secured to the lower end of the post 15 is a stem element 16 provided with an enlarged lower end 17 socketed as at 18 and threaded to receive the bolt 20, the head 21 of which is slotted as at 22 for the application of a screw driver.

These supporting elements extend axially of the shock absorber and downwardly into the confines of the cylinder 10 and serve to support a partition member designated generally by the reference character 25 and extending into either positive contact with the inner walls of the cylinder 10 or spaced a few thousandths of an inch therefrom to provide a laminar clearance space. The features of novelty of the present invention are fully applicable to either arrangement of the modification adopted. There is a central opening in the partition member 25 through which the bolt or screw 20 extends and by which it is supported from the stem 16.

An annular outwardly disposed series of openings 27 are formed in the partition 25 and at this radial point it will be noted that the plate or partition 25 is somewhat thinner than at the intermediate or hub portion. Inwardly of the series of openings 27 is another series of openings or passageways 30 which pass through the thicker hub portion of the partition and in this particular embodiment, all open into an annular channel 31 formed in the bottom face of the plate 25.

For the purpose of valving the openings 27 and 30 resilient disc flap valve elements are employed which may be made of extremely thin metal or any other resilient material depending upon the duty to which the shock absorber is applied. The upper disc 32 secured centrally upon the bolt 20 is of the same diameter as the hub portion of the plate 25 and overlies the orifices of the inner series of openings 30 which are formed in the upper surface of the plate.

Applied against the bottom surface of the plate or partition 25 is the lower disc valve 35 which is also disposed upon the bolt 20 and held in position by the head 21 of that bolt. This valve element is of considerably larger diameter than the element 32 since it must cover the lower orifices of the outer series of openings 27. In radial registry with the channel 31 the lower valve plate 35 may be provided with any desired number of openings 36 through which fluid may freely flow into the groove or channel 31 and the series of openings 30.

It will thus be seen that flow of fluid upwardly from the working chamber 40 of the shock absorber into the expansion chamber or register 42 will pass through the openings 36, the groove 31, the passageways 30, and past the sprung valve 32, upon the development of sufficient pressure in the working chamber. Upon the application of less pressure in the upper portion of the working chamber 20 than in the reservoir 42, as by the downward movement of the shock absorber piston within the cylinder 10, the valve 32 will be firmly held in closed position and fluid will flow through the openings 27 and past the spring valve 35, into the working chamber 40.

The leaf spring valve 35 in arrangements of this type will be exceedingly thin and not offer very much resistance to return flow of the fluid from the cavitation chamber or reservoir 42 into the working chamber. However, it is ordinarily desirable to have the valving of the upflow openings 30 somewhat stronger, so the valve member 32 will be stiffer and offer more resistance to flow through these inner openings 30 upon compression movement of the shock absorber piston.

Also, upon such compression movement the working fluid will be forced through the openings 30 and past the margins of the valve 32 with such high velocity that turbulence and foaming might be caused in the reservoir or cavitation chamber 42, particularly if the jets of fluid were to shoot upwardly through the supply in this chamber and break through the surface thereof into the slight air space provided above the level of the fluid. For the purpose of inhibiting or preventing such emulsification of the fluid, a baffle such as shown generally at 50 is provided. This baffle comprises essentially a mesh screen 51 which is centrally perforated to fit around the bolt 20 and has hub portions 52 and 53 applied around the central opening and clamped by means of the bolt 20 in position above the valving partition. The annular hub portion 52 forms a part of an upper frame member which includes the spoke portions 54 and the flanged rim 55, as shown in Figures 1 and 2 of the drawings. The lower part of the screen enclosing arrangement is similarly formed by spokes extending from the inner hub member 53 to an outer rim 56 which is overlapped by the downwardly directed flange 57 of the upper rim 55.

In Figures 3, 4 and 5 of the drawings there is illustrated an alternative embodiment of the invention in which certain of the parts are modified and others remain the same as those disclosed in Figures 1 and 2. The identical parts will be given the same reference characters and the slightly modified parts given similar reference characters with superscriptions in the form of letters. The principal changes are in the valving arrangement associated with the valve plate or partition 25ª. In the lower face of the partition the annular groove or channel 31 is omitted and in this case the openings 36 in the lower valve member 35 must be made in accurate registry with the lower ends of the passageways 30ª. However, this arrangement is not exclusively associated with the other improvements in this figure and so far as the other changes are concerned, the same lower valving features as shown in Figure 1 may be employed.

With regard to the valving of the orifices of the passageways 30ª by means of the upper valve member 32, a distinctly novel and very effective feature is involved. With particular reference to Figures 4 and 5 of the drawings, it will be noted that the plate or partition disc 25ª, in its thickened intermediate hub portion is provided with the grooves or channels 60 which surround each orifice of the passageways 30ª. This leaves a small annular boss 62 surrounding each orifice 30ª which forms a sort of jet for the discharge of the upward flowing of the working fluid. One of the principal features of this arrangement lies in the quick and clean opening and closing of the orifice by means of the spring valve 32 in seating quickly and firmly upon the boss or jet portion 62, and without the possibility of the oil or other working fluid seeping back beneath the valve 32 and between the lower surface of the valve disc and the upper surface of the intermediate portion of the plate 25. Without the provision of this channel 60 some of the working fluid would be retained beneath the valve plate 32 and adhere thereto and prevent the quick and accurate closing of the valve and also interfere with the proper opening thereof.

With the provision of the channel 60 the area of contact of the valve with the orifice 62 is considerably reduced, and at the same time sticking of the valve by the adhering of working fluid beneath the same is prevented.

In Figure 6 of the drawings this same principle has been applied to a similar valving arrangement upon the piston of a shock absorber. The cylinder 10 here encloses the working chamber 40 in which a piston 65 reciprocates, the piston being carried upon the upper end of a piston rod 66. The arrangement may be of the type where the piston fits snugly within the cylinder 10 or is spaced a few thousandths of an inch away from the inner walls thereof. However, the piston is thicker at its intermediate portion in a fashion similar to the partition 25 and 25ª in the previous embodiments and an annular series of bypass passageways 67 is provided. These passageways open upwardly through the enlarged or thickened portion of the piston adjacent the margins of said thickened portion. Surrounding the orifices of the passageway are the grooves 70 which correspond to the groove 60 shown in the partition embodiments and there is thus provided narrow jet orifices 72 for the passageways 67. The valve 75 corresponds in this embodiment to the upper valve 32 of the earlier illustrated ones.

It is understood that various changes and modifications may be made in the embodiments illustrated and described herein without departing from the scope of the invention as defined by the following claims.

Having thus described the invention, what is claimed as new and desired to be secured by Letters Patent is:

1. In a shock absorber of the class described, a cylindrical casing; a rigid circular block of substantial thickness in the axial direction, extending transversely of the interior of said casing, and having at least one opening therethrough through which working liquid may flow from one portion of the interior of the casing to another in an axial direction during operation of the shock absorber; means for maintaining said block coaxially of the casing; said block having an upper surface lying for the most part in a single transverse plane through which surface said orifice opens; a resilient disc flap valve member having its central portion secured rigidly to said block and lying, in normal valve closed position, flat against and in close contact with said surface of the block throughout its planar extent including the area comprising the mouth of said orifice; a groove formed in said planar surface of the block surrounding the mouth of said orifice and leaving an annular lip immediately about said orifice, which lip is co-planar with the planar surface of the block as a whole but surrounded by a moat provided by the forming of said groove, whereby said disc valve member may lie in closed position against the block surface and the orifice lip without such occlusion of working fluid beneath the valve member in the vicinity of said orifice due to capillarity, which would be liable to cause the valve to stick or fail to close promptly and accurately.

2. The device as set forth in claim 1 in which said orifice is set close to an edge of said body surface, whereby said groove is not a complete annulus but intersects the periphery of the body surface, and a portion of said raised lip is constituted by the outer margin of said body at said surface.

3. The device as set forth in claim 1 in which said body is the working piston which reciprocates within the cylindrical casing of the shock absorber.

4. In a shock absorber of the direct acting type comprising a cylindrical casing containing a damping liquid and having a piston reciprocating therein, means dividing said cylindrical casing into a working chamber in which the piston reciprocates and an upwardly disposed expansion chamber, said means comprising: a partition plate secured at its margins to the walls of said casing extending transversely of the interior of said casing and having at least one opening therethrough through which working fluid is adapted to flow from the lower working chamber into the upper expansion chamber during certain conditions of operation, said partition being rigid and of substantial thickness and having an uppermost surface lying for the most part in a single transverse plane, a resilient disc flap valve secured centrally of the partition at the upper side thereof and, in valve closed position, lying flat against said surface of the partition and covering the upper orifice of said opening, a groove in the said surface surrounding said orifice and creating a raised narrow annular lip around the orifice, said lip lying in the plane of said surface and against which the flap valve is adapted to close, without occlusion of fluid beneath the valve disc in the vicinity of said orifice due to capillarity, which would be liable to cause the valve to stick or fail to close promptly and accurately.

5. The device as set forth in claim 4 in which at least one other orifice than the first mentioned one is provided through said body for the passage of working fluid in the opposite direction, a thin disc flap valve applied against the opposite surface of the body and adapted to control the flow through the last named orifice, an annular groove in said last named surface into which said first named opening enters and at least one opening through the latter disc valve registering with a portion of said groove, whereby extreme accuracy in registering the openings in the second named disc valve with the openings of the first series through said body is rendered unnecessary.

6. The device as set forth in claim 4 in which a baffle is provided within said casing at a point spaced from said body in the direction of spurting of the fluid through said orifice, in order to break the force of the jet thus formed and prevent emulsification and foaming.

7. The device as set forth in claim 6 in which said baffle comprises a mesh screen.

References Cited in the file of this patent

UNITED STATES PATENTS

| | | |
|---|---|---|
| 1,864,787 | Williams | June 28, 1932 |
| 1,909,582 | Hopkinson et al. | May 16, 1933 |
| 2,239,112 | Nickelsen | Apr. 22, 1941 |
| 2,357,278 | O'Connor | Aug. 29, 1944 |
| 2,467,098 | Rossman | Apr. 12, 1949 |
| 2,648,405 | Palmer | Aug. 11, 1953 |
| 2,649,938 | Crabtree | Aug. 25, 1953 |

FOREIGN PATENTS

| | | |
|---|---|---|
| 671,712 | Great Britain | May 7, 1952 |